Dec. 5, 1933.  C. J. HALBORG  1,937,887
BROACHING DEVICE
Filed Oct. 28, 1930  2 Sheets-Sheet 1
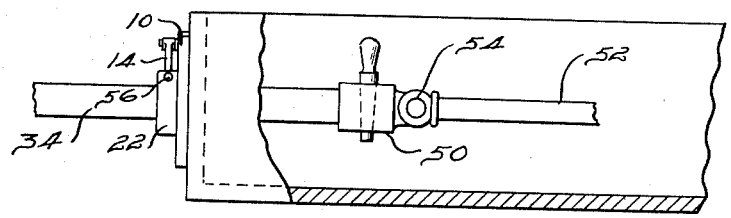
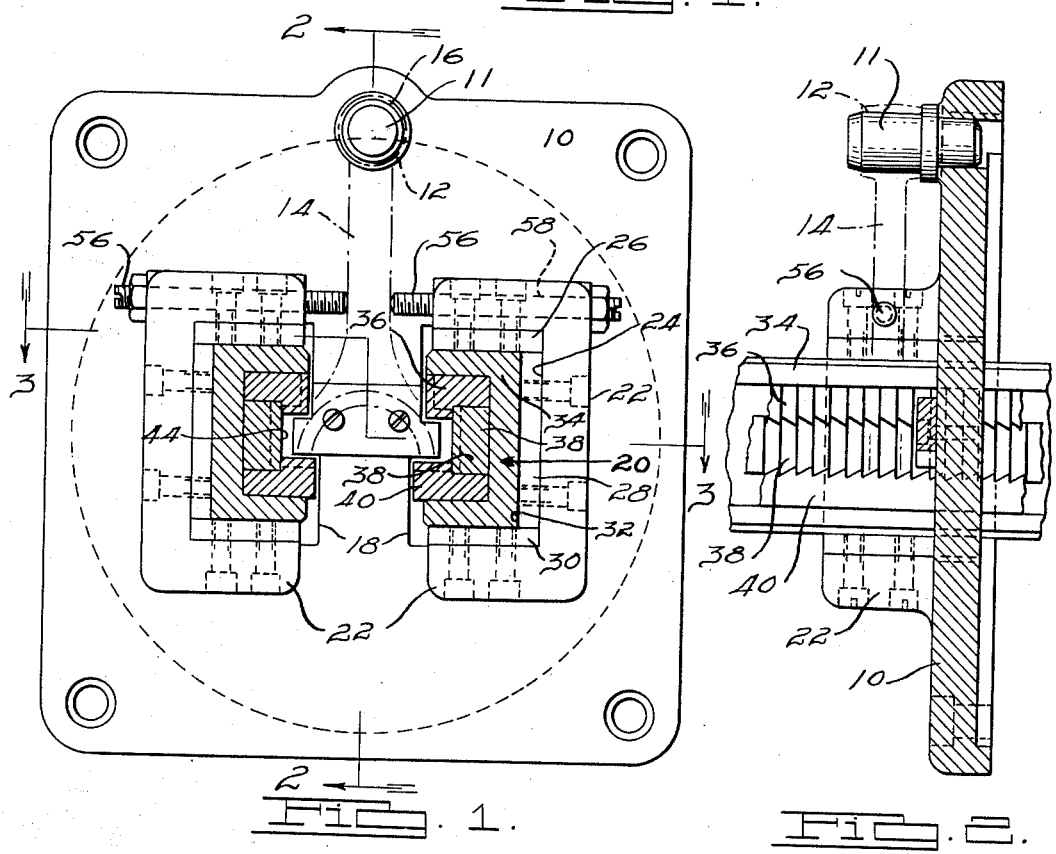
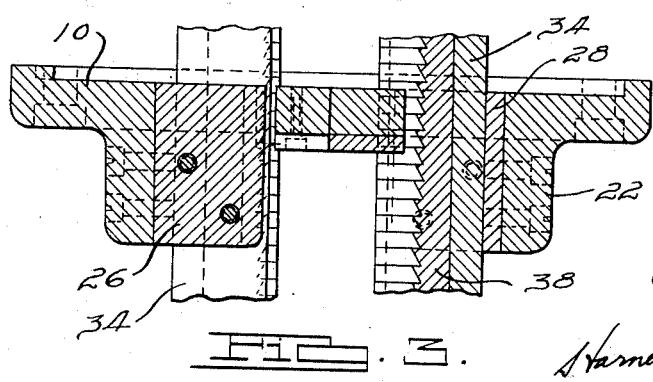
INVENTOR
CARL J. HALBORG
BY
ATTORNEY

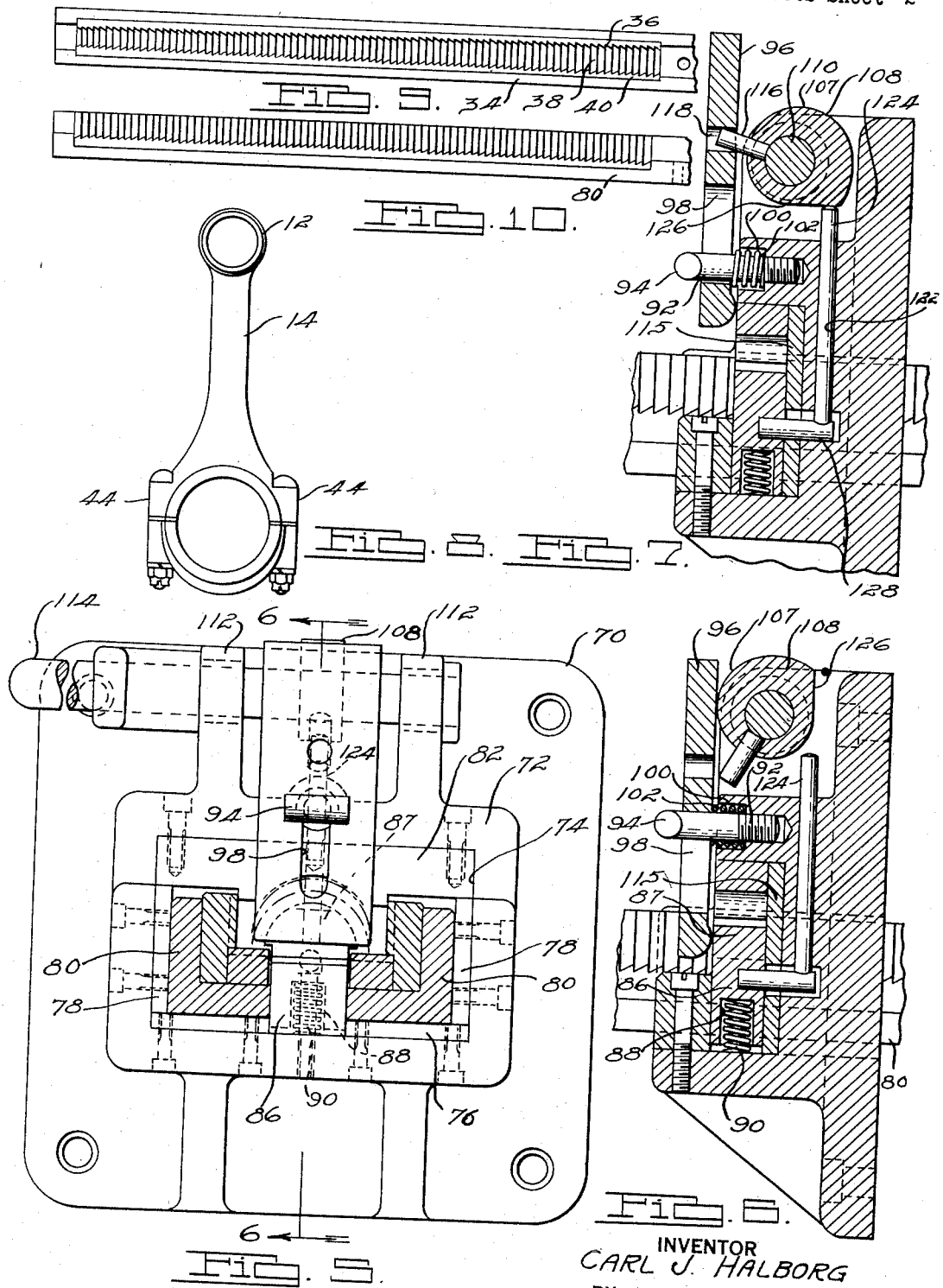

Patented Dec. 5, 1933

1,937,887

UNITED STATES PATENT OFFICE 1,937,887

BROACHING DEVICE

Carl J. Halborg, Detroit, Mich., assignor to Colonial Broach Company, a corporation of Michigan Application October 28, 1930. Serial No. 491,767

8 Claims. (Cl. 90—33)

The broaching device comprising the present invention is designed for use in connection with the broaching of the mating edges, the seats for the heads of tie connecting rod bolts, and the sides of the bolt bosses which control the effective width of the large ends of tie rods, of both the cap and body portions of connecting rods, although the principles of the invention may be extended to cover the shaping of other machine elements by a broaching operation.

As at present manufactured, the connecting rod parts, whether they be the connecting rod bodies or the connecting rod caps, are shaped by a milling operation, the usual method being to arrange the parts in gangs on the table of a milling machine and, when the parts are so positioned, a suitable milling tool is caused to remove the surplus metal and thus the desired faces are machined on the connecting rod parts. In the absence of any other more economical method of forming the connecting rod, modern manufacturers have resorted to this practice almost exclusively, admitting however, that such a method is unduly expensive, both because of the relatively high cost of the equipment involved and because a considerable amount of time is consumed in the milling of each gang of parts. Furthermore, with this method a high degree of precision is not obtainable in quantity production and it frequently happens that after the gangs are removed from the milling machine and separated, the individual parts of the connecting rods must be subjected to a further trimming operation. In addition to this, the care and attention required by a milling machine in operation precludes the possibility of employing unskilled labor as only highly skilled artisans may be entrusted with the care and adjustment, if not the operation of a milling machine. The labor costs, therefore, are unusually high and because of these disadvantages the milling of connecting rods, in the absence of any other method of forming the rods, has proven to be a necessary evil.

The present invention contemplates the provision of a method of and an apparatus for forming connecting rods which will obviate all of the above mentioned difficulties. Specifically, it contemplates the provision of a method and apparatus the operation of which may be entrusted to unskilled labor, thereby effecting a considerable reduction in the cost of manufacture of the rods. Furthermore, the present apparatus is not an expensive one as regards its initial cost and as regards its upkeep, inasmuch as it does not involve the use of complicated tools or apparatus. Furthermore, the tools that are employed in forming the connecting rods are not subject to rapid deterioration and the same tools may be employed over and over again for shaping a great number of connecting rods before re-sharpening or substitution of the tools is required.

Other objects of the invention, not at this time more particularly enumerated, will become more readily apparent as the nature of the invention is better understood and the same consists in the novel construction, combination and arrangements of parts shown in the accompanying two sheets of drawings, in which:

Fig. 1 is a sectional view showing the broaching device in assembled position in operation upon a connecting rod body. This view is taken transversely of the device in advance of the work upon which it is acting.

Fig. 2 is a sectional view taken substantially along the line 2—2 of Fig. 1.

Fig. 3 is a sectional view taken substantially along the line 3—3 of Fig. 1.

Fig. 4 is a side elevational view, partly in section, showing the assembled device positioned on a broaching machine.

Fig. 5 is a sectional view similar to Fig. 1 showing a modified form of broaching device for broaching the cap portion of the connecting rod.

Fig. 6 is a sectional view taken substantially along the line 6—6 of Fig. 5. This view shows the connecting rod clamping mechanism which forms a part of the present invention in closed position and securely engaging a cap to hold the same in position for the broaching operation.

Fig. 7 is a sectional view similar to Fig. 6 showing the clamping mechanism in open position to permit ready insertion or removal of a connecting rod cap.

Fig. 8 is a side elevation of an assembled connected rod manufactured in accordance with the principles of the present invention.

Fig. 9 is a plan view of one set of the actual broaching tool elements employed in shaping the mating edges of the cap and body portions of the connecting body, and Fig. 10 is a sectional view similar to that shown in Fig. 9 showing one of the broaching tools employed in shaping the mating edges and side portions of the connecting rod cap members.

In all of the above described views like characters of reference are employed to designate like parts throughout.

The broaching tool assembly comprises in its general organization a base plate 10 adapted to be bolted or otherwise secured to the front face or table of a broaching machine. Adjacent one edge of the plate a pin 11 is secured. This pin is adapted to receive the small end 12 of a connecting rod body 14 by engagement of the wrist pin bore 16 thereover. The central portion of the base plate 10 is provided with a pair of cut out portions 18 to permit the broaching tool assemblies, which are designated at 20, to be drawn through the plate to act upon the lower or large end of the connecting rod. The pin 11 is so positioned on the plate 10 as to locate the small end of the connecting rod, which necessarily must previously have been bored out, in order that the large end of the connecting rod body may lie against the central portion of the base plate with its outer side and with the outer areas of the mating edge extended over the openings 18 that these surfaces or edges may be acted upon by the broaching tool assembly 20 on either side of the connecting rod.

Two of these broaching tool assemblies are required for simultaneously acting upon each side of a single connecting rod positioned upon the base plate. Although two of these assemblies have been shown at 20, they are both identical in their construction and it is thought that a description of one will suffice for the purpose of illustrating the invention. Secured to the base plate 10 and partially surrounding each of the openings 18 are a pair of guiding elements 22. These elements are substantially U-shaped in cross section and have their inner surfaces disposed perpendicular to the face of the plate 10. Each guide element 22 is therefore provided with an inwardly opening rectangular recess 24 forming a channel. Each recess 24 is provided with a plurality of wear plates 26, 28 and 30 forming a rectangular channel 32 in which the body portion 34 of the broaching tool assembly is slidable. The body portion 34 of the broaching tool assembly is substantially U-shaped in cross section and has secured to its inner surface a plurality of broaching tool elements 36, 38 and 40. These elements are so oriented with respect to each other and to the lower ends of the connecting rod body as to mate with the corresponding surfaces of the same to be formed. The broaching tool element 40 is adapted to machine the surface of the connecting rod body which mates with the corresponding surface of the connecting rod cap. The element 36 is adapted to machine the surface of the connecting rod which receives the head of the cap screws which connect the parts of the connecting rod assembly together, while the broaching tool element 38 is adapted to machine the outer surfaces of the bolt bosses 44.

In Fig. 1 the body portions 34 of the respective tool assemblies have been shown as being formed independently of each other. However, if desired the lower portion of these body portions may be formed integrally and when positioned for operation upon a connecting rod, they will be connected together or extended across the lower surface of the connected rod, and in such case may be formed to machine additional surfaces of the work. In such an instance it is obvious that the cut-away portions 18 in the base plate 10, will be superseded by a single cut-away portion to permit sliding movement of the assembly. However, irrespective of these details in manufacturing the essential features of the invention are always preserved.

In operation, the broaching tool assemblies 20 are drawn through the base plate 10 to act upon a connecting rod and by connecting the assemblies in a suitable broaching machine this is effected. Toward this end the stem of each assembly is provided with a conventional key connection 50 to a pull shaft 52 through a pivotal connection. While the pin 11 serves to properly position the small end of the connecting rod body 12, the end of the body which is to be shaped by the broaching tool may be located in its proper position by means of a pair of locating pins 56 which are threadably receivable in bores 58 extending through the broaching tool assembly guide. These locating pins are in the form of elongated set screws and have their ends slotted to permit adjustment of the same. When properly positioned these pins permit a limited amount of swinging movement of the connecting rod. The connecting rod may thus float about the axis of the pin 11 in order to permit the rod to adjust itself relative to the broaching tool in order to equalize the amount of stock being removed from each side of the same.

Since the broaching tool assemblies are drawn through the plate 10 to act upon the connecting rod in a direction from the connecting rod through the plate rearwardly, it is not required that the connecting rod be held against the base plate by any external agency. The action of the broach in operation will maintain the connecting rod in proper position firmly against the plate 10.

The method involved in the present construction is not only applicable to the broaching of connecting rod bodies for by modifying the construction of the apparatus shown in Figs. 1, 2 and 3, the apparatus may be designed to accommodate the machining of connecting caps also.

Referring now to Figs. 5, 6 and 7, the bed or base plate is designated at 70. This base plate is provided with a guide member 72 corresponding to the guide member 22 shown in Fig. 1. This guide member 72 may be secured in any manner to the base plate or as shown may be formed integrally thereon and is provided with a pair of channel shaped recesses 74 having wear plates 76 and 78 secured in each channel and in which wear plates the bodies 80 of the broaching tool assemblies are slidable. In this instance, each body 80 of the broaching tool assemblies is L-shaped in cross-section. In this instance a single broaching tool element may be employed for machining the mating faces and the sides of the bosses of the connecting rod cap, inasmuch as it is not desired to machine the seat for the connecting rod bolt nut. The impracticability of machining this seat in most cases arises because of interference with the usual reinforcing ribs commonly provided on the caps of connecting rods.

In order to position the cap upon the base plate assembly to be acted upon by the broaching tool assembly, a cross member 82 having a semi-cylindrical recess formed centrally therein extends between the sides of the guide portion 72. Suitably guided for vertical movement between the two broaching tool assemblies is a vertically movable block member 86, the upper ends of which have formed thereon a pad 87 semi-circular in shape and complementary to the inner surfaces of the cap. Disposed within a recess 88 in the block 86 is a compression coil spring 90 which normally urges the block 86 together with its pad 87, upwardly.

Positioned above the plane of the broaching tool assemblies is a pin 92 having a head 94 thereon. A clamping plate is shown at 96 and is provided with a vertically disposed slot 98 therein through which the shank of the pin 92 extends. A recess is provided at 100 in the base plate and in this recess is disposed a compression coil spring 102 which surrounds the pin 92 and by engagement with the sides of the slot 98 normally urges the clamping plate 96 outwardly against the head 94 of the pin 92. By this arrangement of parts, it will be seen that although the clamping plate 96 is frictionally held against the head 94 of the pin 92, it is movable in a plane parallel to the base plate 70 and it is also permitted a pivotal movement in a plane perpendicular to the plane of the base plate 70. The lower end of the clamping plate extends downwardly and overlies the upper portion of the channel 74 on each side of the guide member 72.

Disposed between the upper end of the clamping plate 96 and the upper area of the base plate 70 is a rotatable cam element 108, which cam element is mounted on a transverse shaft 110 pivoted between webs 112 formed on the base plate 70. The shaft 110 is provided with an operating handle 114 for rotating the cam 108. Extending into the cam and projecting therefrom is a pin 116. Extending through the clamping plate 96 is a cooperating opening 118 adapted to receive therein the pin 116 for elevating the clamping plate. The plate 70 is provided with a vertical bore 122 in which is slidable a pin 124. This pin projects upwardly out of the bore 122 and is adapted to cooperate with an operative surface 126 on the cam member 108. The lower end of the pin 124 is rigidly connected to a cross pin 128, an end of which is secured in the block 86, and thus it will be seen that vertical movement of this block is derived from rotational movement of the shaft 110 through the handle 114. By rotating the shaft 110 by means of the handle 114, the cam 108 is caused to rotate and the pin 116 is caused to enter the hole 118 in the clamping plate 96 to raise this latter plate to withdraw its lower end which normally obstructs the channel 74. Simultaneously with this operation the operative surface 126 on the cam 108 engages the upper end of the pin 124 and depresses the same. Downward movement of the pin is transmitted to the cross pin 128 and from there to the block 86, which is depressed against the action of the spring 90. When the parts have assumed the position just described, a connecting rod cap may then be inserted so that its bosses lie in the channels 74 and its ends abut against a face plate 115. The operating handle 114 may then be reversed to permit the block 86 to be moved upwardly to position the cap in the channels 74. By such reverse movement of the handle, the clamping plate is again moved downwardly over the cap and a camming surface 107 on the cam 108 bears against the upper area of the plate 96 to urge the lower end of the plate inwardly against the cap member to clamp the same rearwardly against the plate 115.

The broach assemblies are now drawn through the base plate 70 by means of the machine shown in Fig. 1 and the faces of the cap are properly machined. After the broach has been drawn through the plate on the machine the handle is operated in the manner first described to release the pressure of the clamping plate 96 on the cap and to depress the block 86 so that upon raising of the clamping plate by continuing movement of the handle, easy withdrawal of the finished cap and insertion of a new cap to be machined is permitted.

The invention is not to be limited to the exact arrangement of parts shown in the accompanying two sheets of drawings or described in this specification, as the principles of the invention are subject to modification. For example, a machine manufactured in accordance with the principles of the present invention may be employed for shaping other machine elements than connecting rod parts. Only insofar as the invention has been particularly pointed out in the accompanying claims is the same to be limited.

What I claim is:

1. An apparatus for forming finished surfaces on opposite sides of connecting rod body including, in combination, a stationary face plate, a pin on said plate adapted to receive thereover the wrist pin bore of the connecting rod body, adjustable means for limiting the pivotal movement of said body on said pin, a plurality of broaching tools adapted to engage the rough surfaces on either side of the body, and means for simultaneously drawing the broaching tools transversely over the rough surfaces of the connecting rod body to finish the same relative to the wrist pin bore.

2. A device for forming the mating surfaces of a connecting rod body, the seats for the connecting rod bolt assembly, and the sides of the bolt bosses including, in combination, a face plate having a pin thereon adapted to pivotally receive the wrist pin bore of the connecting body, a pair of opposed guides on said plate and a pair of broaching tool assemblies slidable on said guides, each of said assemblies comprising a body portion and a plurality of broaching tools having operative surfaces adapted to respectively engage the rough surfaces to be formed and means for effecting the slidable movement of the tool in said guide to simultaneously finish the above enumerated surfaces on both sides of the rod.

3. In a device for forming mating surfaces of a connecting rod part and the sides of the bolt bosses including, in combination a face plate having a recess therein adapted to receive the connecting rod part, means for releasably clamping the part in the recess with the sides and edges exposed, and a plurality of broaching tools slidable in said face plate, having angular cutting surfaces presented toward each other corresponding to the surfaces of the sides and edges on the part to be formed.

4. A device for machining bolt bosses and the mating face of the crank shaft portion of a connecting rod which includes, in combination, means for pivotally supporting the connecting rod against a face plate with a portion to be machined in the path of movement of broaching cutters, broaching cutters having cutting edges of U-shape which are presented toward each other, and a mechanism for reciprocating said cutters simultaneously for machining the ends of the connecting rod which is swingable in a path of movement of the cutters.

5. A device for machining the bolt bosses and the mating face of the crank shaft portion of the connecting rod which includes, in combination, means for supporting the rod against a face plate with the portion to be machined positioned in the path of movement of broaching cutters, broaching cutters of U-shape which are presented toward each other, and a mechanism for reciprocating said cutters simultaneously for machining the top, sides and bottom of the bosses on both sides of the rod.

6. A device for forming finished surfaces on a work part which includes, in combination, means for clamping the part on a stationary base plate against movement in a plane parallel to the surfaces to be formed, while permitting a floating movement of the part substantially perpendicular to the plane of the surface, broaching means disposed to have cutting edges face each other, and a mechanism for drawing said broaching means over the opposite surfaces of the part to be finished.

7. A device for forming a finished surface on opposite sides of a part to be machined which includes, in combination, means for supporting the part against movement in a plane parallel to the surface to be formed while permitting a lateral floating movement of the part in a direction perpendicular to the plane of the surface, a pair of oppositely disposed like broaching tools, and a mechanism for drawing said tools over the rough surface on each side of the part to be finished.

8. A device for forming the sides of the bolt bosses to control the effective width of the end of a connecting rod body which includes, in combination, means for pivoting the end of the connecting rod on a stationary face plate remote from the surface to be formed, a pair of broaching tools having inwardly presenting cutting edges, and a mechanism for drawing said tools over the rough surface on each side of the rod to be finished as the rod end to be finished is shiftable relative to the lateral dimension between the broach.

CARL J. HALBORG.